US011935673B2

(12) United States Patent
Czubarow et al.

(10) Patent No.: US 11,935,673 B2
(45) Date of Patent: Mar. 19, 2024

(54) VARISTOR FORMING PASTE, CURED PRODUCT THEREOF, AND VARISTOR

(71) Applicant: NAMICS CORPORATION, Niigata (JP)

(72) Inventors: Pawel Czubarow, Framingham, MA (US); Daisuke Hashimoto, Niigata (JP); Yoshitaka Kamata, Niigata (JP); Toshiyuki Sato, Niigata (JP)

(73) Assignee: NAMICS CORPORATION, Niigata (JP)

( * ) Notice: Subject to any disclaimer, the term of this patent is extended or adjusted under 35 U.S.C. 154(b) by 128 days.

(21) Appl. No.: 17/782,211

(22) PCT Filed: Sep. 25, 2020

(86) PCT No.: PCT/JP2020/036243
§ 371 (c)(1),
(2) Date: Jun. 3, 2022

(87) PCT Pub. No.: WO2021/111711
PCT Pub. Date: Jun. 10, 2021

(65) Prior Publication Data
US 2023/0013549 A1 Jan. 19, 2023

Related U.S. Application Data

(60) Provisional application No. 62/943,419, filed on Dec. 4, 2019.

(51) Int. Cl.
*H01C 7/10* (2006.01)
*H01C 7/102* (2006.01)
*H01C 17/065* (2006.01)

(52) U.S. Cl.
CPC ........... *H01C 7/1006* (2013.01); *H01C 7/102* (2013.01); *H01C 17/0652* (2013.01); *H01C 17/06586* (2013.01)

(58) Field of Classification Search
CPC ......... H01C 7/10; H01C 7/102; H01C 7/1006
See application file for complete search history.

(56) References Cited

U.S. PATENT DOCUMENTS 5,416,462 A 5/1995 Demarmels et al.
2018/0037757 A1 2/2018 Walters et al.
2021/0155769 A1* 5/2021 Kamata .................. H01C 7/105

FOREIGN PATENT DOCUMENTS

JP H06-215903 8/1994
JP 2018-514492 6/2018
WO 2019/116955 6/2019

OTHER PUBLICATIONS

International Search Report, dated Nov. 24, 2020, 2 pages.

* cited by examiner

*Primary Examiner* — Khanh T Nguyen
(74) *Attorney, Agent, or Firm* — RANKIN, HILL & CLARK LLP

(57) ABSTRACT

Provided are a varistor forming paste, a cured product thereof, and a varistor, that can increase the degree of freedom in designing an electronic device, and can exhibit appropriate varistor characteristics. The varistor forming paste contains an epoxy resin (A), a curing agent (B), and a carbon aerogel (C).

13 Claims, 1 Drawing Sheet

VARISTOR FORMING PASTE, CURED PRODUCT THEREOF, AND VARISTOR

TECHNICAL FIELD

The present invention relates to a varistor forming paste, a cured product thereof, and a varistor.

BACKGROUND ART

A varistor is an element that exhibits non-linear resistance characteristics in which voltage-current characteristics connecting conductive portions such as electrodes separated from each other do not follow Ohm's law. The varistor exhibits non-linear resistance characteristics that do not follow Ohm's law, in which when a voltage between a pair of conductive portions separated from each other is as low as a predetermined value or less, an electric resistance is high, and when the voltage between a pair of electrodes becomes more than or equal to the predetermined value, the electric resistance sharply increases. In the present specification, the non-linear resistance characteristics in which the voltage-current characteristics do not follow Ohm's law is also referred to as varistor characteristics. Examples of materials having non-linear resistance characteristics include semiconductor ceramics such as silicon carbide, zinc oxide, and strontium titanate. The varistor is used for applications such as (1) protecting electronic devices from surge voltages such as lightning surges, (2) protecting ICs from abnormal signal voltages, and (3) protecting the electronic devices from electrostatic breakdown (Electro-Static Discharge: ESD) derived from a human body.

As a composition constituting a conductive member, for example, PATENT LITERATURE 1 discloses a conductive ink used for applications such as a flexible conductive circuit, an LED, a sensor, and a solar cell. The ink contains a binder component, a solvent component in which the binder component is dissolved, and carbon-based nanoparticles uniformly dispersed in the binder component.

CITATION LIST

Patent Literature

PATENT LITERATURE 1: JP-T-2018-514492

SUMMARY OF INVENTION

Problems to be Solved by Invention

In the ink constituting the conductive member described in PATENT LITERATURE 1, the varistor characteristics is not described.

The varistor is generally made of semiconductor ceramics using a material having non-linear resistance characteristics (varistor characteristics). For example, when mounting a varistor made of semiconductor ceramics having non-linear resistance characteristics between a pair of separated conductive members, it is necessary to design in consideration of mounting the varistor. Therefore, the degree of freedom in designing a substrate, an IC, or an electronic device is reduced. Further, few varistors made of semiconductor ceramics have flexibility that can follow the flexible conductive circuit or the like. Further, as for a voltage of a predetermined value that exhibits the varistor characteristics, a material exhibiting non-linear resistance characteristics is required for various voltages from high voltage to low voltage.

An object of an aspect of the present invention is to provide the following varistor forming paste, a cured product thereof, and a varistor, using a material that has not been used in a varistor made of semiconductor ceramics. The varistor forming paste, the cured product thereof, and the varistor can increase the degree of freedom in designing the electronic device, can follow the flexible conductive circuit or the like, and can exhibit appropriate varistor characteristics.

Solution to Problems

Means for solving the above problems are as follows, and the present invention includes the following aspects.

A first aspect of the present invention is a varistor forming paste including an epoxy resin (A), a curing agent (B), and a carbon aerogel (C).

A second aspect of the present invention is a cured product of the varistor forming paste.

A third aspect of the present invention is a varistor containing the cured product of the varistor forming paste.

Effects of Invention

According to the present invention, it is possible to provide a varistor forming paste, a cured product thereof, and a varistor, that can increase the degree of freedom in designing the electronic device, and can exhibit appropriate varistor characteristics.

DESCRIPTION OF EMBODIMENTS

Hereinafter, a varistor forming paste according to the present disclosure will be described based on an embodiment. However, the embodiment described below is an example for embodying a technical idea of the present invention. The present invention is not limited to the following varistor forming paste.

A varistor forming paste according to a first embodiment of the present invention includes:

an epoxy resin (A);

a curing agent (B); and a carbon aerogel (C).

Voltage-current characteristics between a pair of separated conductive members are approximated by equation (1) $I=K\cdot V\alpha$ (K is a constant). In the equation (1), $\alpha$ is a nonlinear coefficient. When contact between the pair of separated conductive members is contact through a normal resistor (for example, ohmic contact), nonlinear coefficient $\alpha$ is 1 ($\alpha=1$). When the contact between the conductive members is contact through a varistor, $\alpha$ is larger than 1 ($\alpha>1$). Varistor characteristics of a structure disposed to be connected between the pair of separated conductive members can be measured by measuring current-voltage characteristics of the pair of conductive members and by measuring the nonlinear coefficient $\alpha$ from data of the current-voltage characteristics. Specifically, by analyzing current-voltage characteristic data of the structure disposed to be connected with the conductive member between the pair of conductive members by a simulator, and by curve fitting, values of constant K and nonlinear coefficient α that are suitable for the equation (1) $I=K\cdot V\alpha$ can be obtained. When the non-linear coefficient α measured from the current-voltage characteristics of the structure exceeds 1 ($\alpha>1$), the structure disposed to be connected between the pair of conductive members has non-linear resistance characteristics (varistor characteristics).

The larger the value of the nonlinear coefficient α of the structure disposed to be connected between the pair of conductive members, the higher the varistor characteristics for a large surge voltage. If the nonlinear coefficient α of the structure is greater than 6 ($\alpha>6$), the structure has appropriate varistor characteristics that can withstand the intended use. The varistor forming paste according to the first embodiment of the present invention can exhibit the varistor characteristics by containing a carbon aerogel made of porous carbon. Mechanism by which the paste containing a carbon aerogel exhibits the varistor characteristics is not clear. It is presumed that the structure of carbon aerogel having fine pores with a pore diameter of 1 μm or less is related to the non-linear resistance characteristics for the surge voltage.

Figure 1:
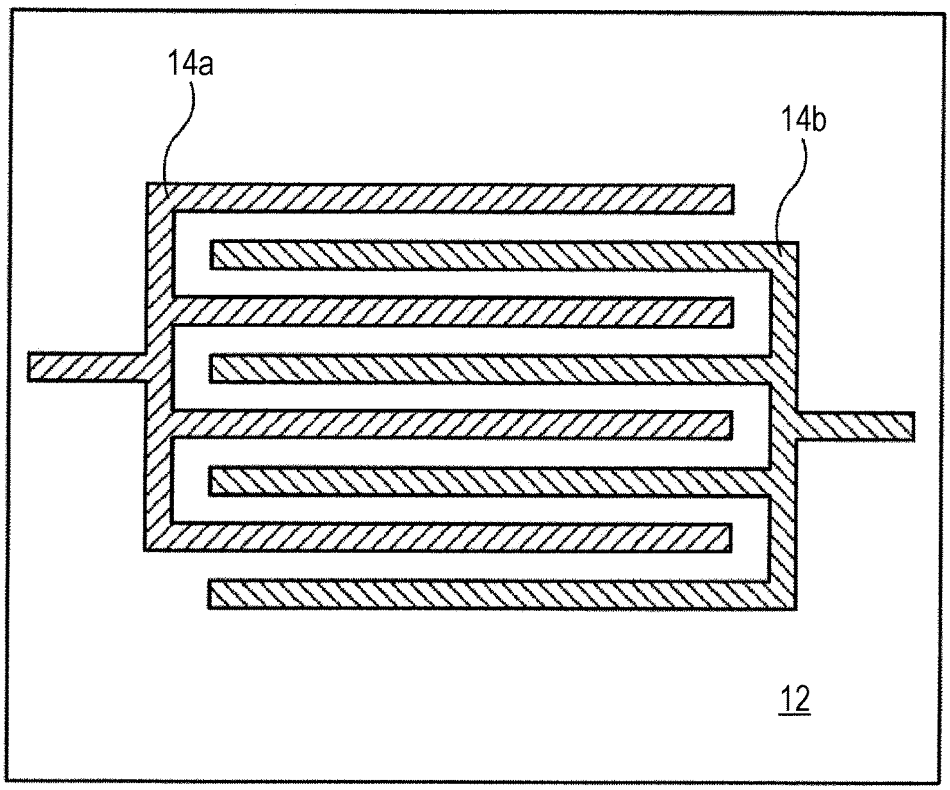
FIG. 1 is a schematic plan view illustrating an example of an electrode used for a varistor element.
Figure 2:
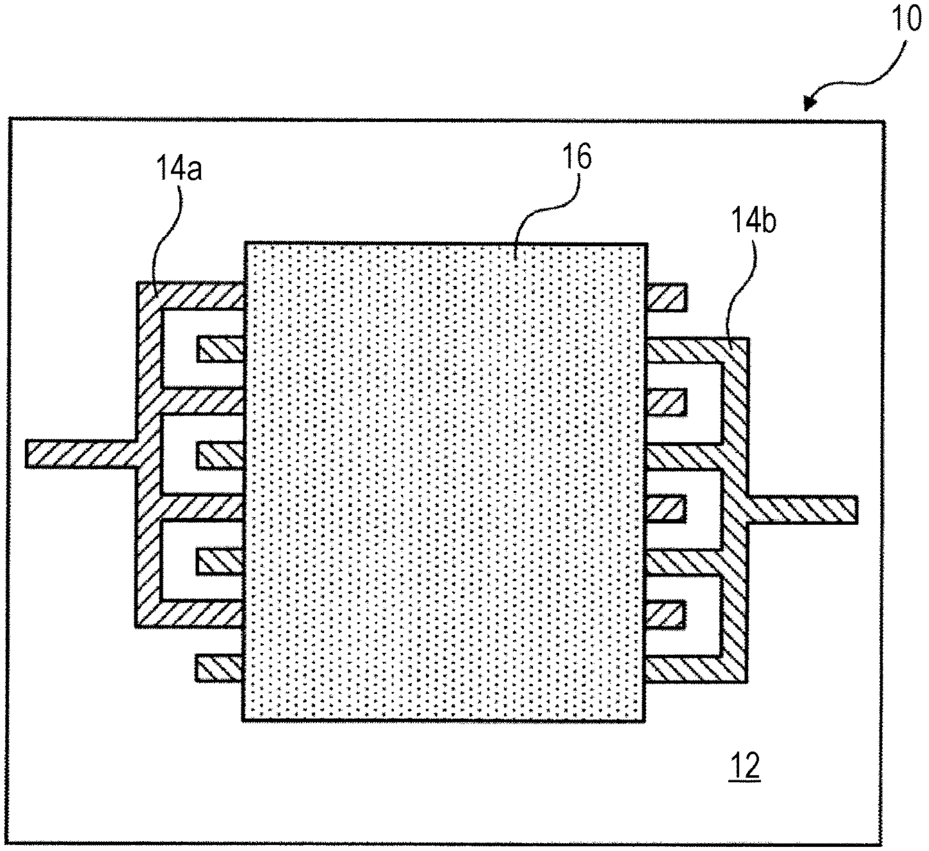
FIG. 2 is a schematic plan view illustrating an example of the varistor element.

FIG. 1 is a schematic plan view illustrating a pair of electrodes 14*a* and 14*b* on a substrate 12 as an example of the pair of conductive members. FIG. 2 is a schematic plan view of a varistor element 10. In the varistor element 10, a varistor 16 is disposed on the pair of electrodes 14*a* and 14*b* illustrated in FIG. 1 using the varistor forming paste. As illustrated in FIG. 2, the varistor forming paste is applied onto the pair of electrodes 14*a* and 14*b* having a comb-like flat plate-shape in a plan view, and cured to form a cured product, so that it is possible to form the varistor element 10 including the varistor 16 having the cured product as the varistor 16. The varistor element is not limited to an example illustrated in FIG. 2. As the varistor element, for example, a cured product may be used in which the varistor forming paste is applied and cured so as to connect the pair of conductive members arranged three-dimensionally.

(A) Epoxy Resin

As the epoxy resin (A), a monomer, an oligomer, and a polymer having at least one epoxy group in one molecule can be used. The epoxy resin (A) preferably includes at least one selected from the group consisting of bisphenol A type epoxy resin, brominated bisphenol A type epoxy resin, bisphenol F type epoxy resin, aminophenol type epoxy resin, biphenyl type epoxy resin, novolak type epoxy resin, alicyclic epoxy resin, naphthalene type epoxy resin, ether-based epoxy resin, polyether-based epoxy resin, and silicone epoxy copolymer resin. As these epoxy resins, one epoxy resin may be used alone, two or more different types of epoxy resins may be used in combination, and two or more epoxy resins of the same type and different weight average molecular weight may be used in combination. The epoxy resin (A) has at least one epoxy group in one molecule. More preferably, the epoxy resin (A) contains at least one selected from the group consisting of bisphenol A type epoxy resin, bisphenol F type epoxy resin, and aminophenol type epoxy resin.

The aminophenol type epoxy resin may be an epoxy resin having a tertiary amine structure. Specifically, examples of the aminophenol type epoxy resin include N,N-dimethylaminoethyl glycidyl ether, N,N-dimethylaminotrimethyl glycidyl ether, N,N-dimethylaminophenyl glycidyl ether, N,N-diglycidyl-4-glycidyl oxyaniline, and 1,3,5-triglycidyl isocyanurate and the like.

Specific examples of the biphenyl type epoxy resin include 4,4'-diglycidyl biphenyl and 4,4'-diglycidyl-3,3',5,5'-tetramethylbiphenyl.

Examples of the novolak type epoxy resin include phenol novolak, o-cresol novolak, p-cresol novolak, t-butylphenol novolak, and dicyclopentadiencresol.

Examples of the alicyclic epoxy resin include 3,4-epoxycyclohexylmethyl-3',4'-epoxycyclohexanecarboxylate, and bis(3,4-epoxycyclohexylmethyl)adipate.

Examples of the naphthalene type epoxy resin include 1-glycidylnaphthalene, 2-glycidylnaphthalene, 1,2-diglycidylnaphthalene, 1,5-diglycidylnaphthalene, 1,6-diglycidylnaphthalene, 1,7-diglycidylnaphthalene, 2,7-diglycidylnaphthalene, triglycidylnaphthalene, and 1,2,5,6-tetraglycidylnaphthalene.

The epoxy resin (A) is preferably liquid at room temperature. In the present specification, liquid at room temperature means having fluidity at 10 to 35° C. In the epoxy resin (A) that is liquid at room temperature, the epoxy equivalent is preferably 0.001 to 10, more preferably 0.025 to 5, and even more preferably 0.05 to 2. If the epoxy resin (A) is liquid at room temperature, the paste can be produced without adding a solvent or a diluent.

The content of the epoxy resin (A) in the varistor forming paste is preferably 18 to 90 mass %, more preferably 20 to 85 mass %, even more preferably 25 to 80 mass %, and particularly preferably 50 mass % or more with respect to 100 mass % of the varistor forming paste. When the content of the epoxy resin (A) in the varistor forming paste is 18 to 90 mass %, the varistor forming paste can be easily applied, for example, around terminals arranged on the substrate. Further, by curing the applied paste, it is possible to easily form a structure capable of exhibiting the varistor characteristics.

(B) Curing Agent

The curing agent (B) contains at least one selected from the group consisting of an amine-based curing agent, a phenolic curing agent, an acid anhydride-based curing agent, and an imidazole-based curing agent, and may contain two or more in combination. More preferably, the curing agent (B) contains an imidazole compound as the imidazole-based curing agent.

Examples of the imidazole compound include imidazole and an imidazole derivative. When the varistor forming paste contains the imidazole-based curing agent, a varistor having a high nonlinear coefficient α can be obtained. Further, when the varistor forming paste contains both the imidazole compound and an amine compound, a varistor having a higher nonlinear coefficient α can be obtained. When the varistor forming paste contains both the imidazole compound and the amine compound, the amine compound is preferably an amine adduct-based curing agent. Examples of the imidazole compound include 2P 4MZ PW, 2E4MZ (TCI10001) (manufactured by Shikoku Chemicals Corporation) and 1,1'-carbonyldiimidazole (manufactured by Tokyo Chemical Industry Co., Ltd.).

Examples of the amine-based curing agent include aliphatic amine, alicyclic amine, aromatic amine, 3,3'-diethyl-4,4'-diaminodiphenylmethane, dimethylthiotoluenediamine, and diethyltoluenediamine. The 3,3'-diethyl-4,4'-diaminodiphenylmethane is an aromatic amine-based curing agent, and an example thereof is "KAYAHARD A-A (HDAA)" (manufactured by Nippon Kayaku Co., Ltd.). An example of the dimethylthiotoluenediamine is "EH105L" (manufactured by ADEKA Corporation). Moreover, an example of the diethyltoluenediamine is "Ethacure 100" (manufactured by Albemarle Corporation). Examples of the amine adduct-based curing agent include "Amicure PN-40" (manufactured by Ajinomoto Fine-Techno Co., Inc.) and "Novacure HXA9322HP" (manufactured by Asahi Kasei E-Materials Corporation).

An example of the phenolic curing agent is a phenol novolac type curing agent, for example, "Acmex MEH8005H" (manufactured by Meiwa Kasei Co., Ltd.).

An example of the acid anhydride-based curing agent is hexahydro-4-methylphthalic anhydride.

The content of the curing agent (B) in the varistor forming paste is preferably 8 to 80 mass %, more preferably 9 to 75 mass %, and even more preferably 10 to 70 mass % with respect to 100 mass % of the varistor forming paste. When the content of the curing agent (B) in the varistor forming paste is 1 to 20 mass % with respect to 100 mass % of the varistor forming paste, a cured product having a higher nonlinear coefficient $\alpha$ can be obtained.

(C) Carbon Aerogel (C) The carbon aerogel is porous carbon having pores with an average pore size of less than 1 μm. In a Raman spectrum of the porous carbon measured by Raman spectroscopy, an integrated intensity ratio $I_D/I_G$ of an integrated intensity $I_G$ of a G band peak in a range of 1530 $cm^{-1}$ or more and 1630 $cm^{-1}$ or less and an integrated intensity $I_D$ of a D band peak in a range of 1280 $cm^{-1}$ or more and 1380 $cm^{-1}$ or less is 2.0 or more. In the carbon aerogel, porous carbon particles having a diameter of 50 to 60 nm aggregate to form a cluster (an aggregate). As an average particle size of the carbon aerogel, an average particle size of the cluster (aggregate) in which the porous carbon particles are aggregated can be measured. Regarding the pore of the carbon aerogel, a gap between the cluster (aggregate) of the porous carbon and the cluster of another porous carbon (aggregate) can be measured as the pore. The average pore size of the pores of the carbon aerogel (C) is preferably 200 to 300 nm. Regarding the average particle size and the average pore size of the pores of the carbon aerogel (C), it is possible to obtain a TEM photograph of the carbon aerogel (C) observed with a transmission electron microscope (TEM), measure a diameter of the cluster in the TEM photograph, and obtain an arithmetic mean value of measured diameters as the average particle size of the carbon aerogel (porous carbon). Further, it is possible to measure the gap between the clusters, which can be observed from the TEM photograph, as the diameter of the pore, and obtain an arithmetic mean of measured diameters as an average value of the pores.

For the porous carbon that is the carbon aerogel (C), the Raman spectrum can be obtained by measuring an intensity of Raman scattering (Raman shift) with respect to wave number by Raman spectroscopy. The Raman spectrum of a substance made of carbon has peaks near 1590 $cm^{-1}$ and 1350 $cm^{-1}$. In the Raman spectrum of the substance made of carbon, the peak near 1590 $cm^{-1}$ is a G band peak derived from an $Sp^2$ hybrid orbital such as a bonding state of graphite, and the peak near 1350 $cm^{-1}$ is a peak of a D band derived from an $SP^3$ hybrid orbital such as a bonding state of diamond. The D band is a peak due to diamond-like amorphous carbon. Therefore, when the intensity of the D band is high, it is considered that the bonding state of the graphite is disturbed. In the porous carbon that is the carbon aerogel (C), the integrated intensity ratio $I_D/I_G$ of the integrated intensity $I_G$ of the G band peak in the range of 1530 $cm^{-1}$ or more and 1630 $cm^{-1}$ or less and the integrated intensity $I_D$ of the D band peak in the range of 1280 $cm^{-1}$ or more and 1380 $cm^{-1}$ or less is 2.0 or more, more preferably 2.1 or more and 3.0 or less, and even more preferably 2.2 or more and 2.5 or less. When the integrated intensity ratio $I_D/I_G$ in the Raman spectrum of the porous carbon that is the carbon aerogel (C) is 2.0 or more, it can be inferred that a graphite bonding state of carbon is moderately disturbed to form pores of a size and amount suitable for exhibiting the varistor characteristics.

The integrated intensity $I_G$ of the G band peak is a peak area obtained by subtracting a background that is a noise from the G band peak in the Raman spectrum in which the intensity of Raman scattering is plotted against the wave number of Raman scattering. Similar to the integrated intensity of the G band peak, the integrated intensity $I_D$ of the D band peak is also a peak area of the D band obtained by subtracting the background that is the noise from the D band peak in the Raman spectrum in which the intensity of Raman scattering is plotted against the wave number of Raman scattering. The G band peak and the D band peak are close to each other. Therefore, by performing peak fitting using an appropriate function such as a Lorentz function, the G band peak and the D band peak are separated, so that it is possible to measure the integrated intensity $I_G$ of the G band peak, the integrated intensity $I_D$ of the D band peak, and a maximum intensity $M_G$ of the G band peak and a maximum intensity $M_D$ of the D band peak, which will be described below. Such a peak separation method is known.

In the porous carbon that is the carbon aerogel (C), in the Raman spectrum measured by Raman spectroscopy, a maximum intensity ratio $M_D/M_G$ of the maximum intensity $M_G$ of the G band peak and the maximum intensity $M_D$ of the D band peak is preferably 0.80 or more. When the maximum intensity ratio $M_D/M_G$ in the Raman spectrum of the porous carbon that is the carbon aerogel (C) is 0.8 or more, it can be inferred that the graphite bonding state of carbon is moderately disturbed to form the pores of a size and amount suitable for exhibiting the varistor characteristics. The maximum intensity ratio $M_D/M_G$ in the Raman spectrum of the porous carbon that is the carbon aerogel (C) is more preferably 0.80 or more and 3.0 or less, and even more preferably 0.90 or more and 1.5 or less.

The maximum intensity $M_G$ of the G band peak is a maximum value of a peak intensity in the G band obtained by subtracting the background that is the noise from a measured value of a wave number range constituting the G band peak. The maximum intensity $M_D$ of the D band peak is also a maximum value of a peak intensity in the D band obtained by subtracting the background that is the noise from a measured value of a wave number range constituting the D band peak.

The content of the carbon aerogel (C) in the varistor forming paste is preferably 0.05 to 10 mass %, more preferably 0.1 to 8 mass %, and even more preferably 0.5 to 5 mass % with respect to 100 mass % of the varistor forming paste. When the content of the carbon aerogel (C) in the varistor forming paste is 0.05 to 10 mass % with respect to 100 mass % of the varistor forming paste, the cured product having a higher nonlinear coefficient $\alpha$ can be obtained.

Method for Manufacturing Carbon Aerogel (C)

As a first example of a method for producing the porous carbon that is the carbon aerogel (C), the porous carbon can be produced, for example, by thermally decomposing a mixture of raw materials containing furfural and phloroglucinol. Further, as a second example of the method for producing the porous carbon that is the carbon aerogel (C), the porous carbon can be produced, for example, by thermal decomposition of a raw material containing polyimide.

Specifically, the porous carbon that is the carbon aerogel (C) can be produced according to a production method described in U.S. Patent Application No. 62/829,391.

First Example

The first example of the method for producing the porous carbon that is the carbon aerogel (C) will be described below.

The first example of the method for producing the porous carbon that is the carbon aerogel (C) includes a step (a) of preparing phloroglucinol and furfural as the raw materials, a pretreatment step (b) of obtaining an ethanol solution by dissolving phloroglucinol and furfural in ethanol, a gelation step (c) of obtaining a gelled solid by gelling the ethanol solution, a washing step (d) of washing the gelled solid, a supercritical drying step (e) of supercritically drying the washed solid, and a heat treatment step (f) of obtaining the porous carbon by heating the solid after supercritical drying. The production method may include a grinding step (g) of grinding the obtained porous carbon into particles.

In a raw material preparation step (a), furfural is preferably prepared in an amount of 100 to 500 parts by mass, more preferably 120 to 340 parts by mass, and even more preferably 160 to 310 parts by mass, with respect to 100 parts by mass of phloroglucinol.

In the pretreatment step (b), the concentration of phloroglucinol and furfural in the ethanol solution is preferably 1 to 45 mass %, more preferably 1.5 to 30 mass %, even more preferably 2 to 25 mass %.

In the gelation step (c), the gelled solid is obtained by allowing the ethanol solution in which phloroglucinol and furfural are dissolved to stand at room temperature for at least about 168 hours.

In the washing step (d), the gelled solid is washed with ethanol. Washing can also be repeated. The washing is preferably carried out until discharged supernatant liquid is no longer colored.

In the supercritical drying step (e), the gelled solid after washing is placed in a sealed container, and supercritical liquid $CO_2$ is introduced into the sealed container under a predetermined pressure. After maintaining this state for a predetermined time, the supercritical liquid $CO_2$ is discharged. If necessary, the introduction and retention of supercritical liquid $CO_2$ and discharge of the supercritical liquid $CO_2$ may be repeated.

In the heat treatment step (f), the solid after supercritical drying is placed in a furnace and heated to 800° C. to 1500° C. at a heating rate of 0.8 to 1.2° C./min in a nitrogen atmosphere, and heat treatment is performed by maintaining the raised temperature for 5 to 60 minutes. By the heat treatment, a part of the solid is decomposed and a large number of pores are formed, so that the porous carbon that is the carbon aerogel (C) can be obtained.

The porous carbon obtained in the heat treatment step may be ground to a desired size by the grinding step (g). For grinding, for example, an agate mortar or the like can be used. By grinding, as the porous carbon that is the carbon aerogel (C), for example, the porous carbon particles having an average particle size of 0.01 to 50 μm can be obtained. The average particle size means a cumulative 50% particle size (median size, D50) integrated from a small diameter side in a volume-based particle size distribution measured by a laser diffraction/scattering type particle size distribution measuring apparatus (for example, product number: LA-960, manufactured by HORIBA, Ltd.). The average particle size of the porous carbon particles is preferably 0.02 to 10 μm.

Second Example

The second example of the method for producing the porous carbon that is the carbon aerogel (C) will be described below.

(C) The second example of the method for producing the porous carbon that is the carbon aerogel (C) includes a step (a) of preparing anhydrous pyromellitic acid and paraphenyldiamine as raw materials, a pretreatment step (b) of obtaining a polyamic acid solution by synthesizing pyromellitic anhydride and paraphenyldiamine, and obtaining a polyimide solution by synthesizing the obtained polyamic acid solution using a catalyst, a gelation step (c) of obtaining a gelled solid by gelling the obtained polyimide solution, a washing step (d) of washing the gelled solid, a supercritical drying step (e) of supercritically drying the washed solid, and a heat treatment step (f) of obtaining the porous carbon by heating the solid after supercritical drying. The production method may include a grinding step (g) of grinding the obtained porous carbon into particles. Hereinafter, steps different from the first example described above will be described.

In the raw material preparation step (a), anhydrous pyromellitic acid and paraphenyldiamine are prepared as the raw materials.

In the pretreatment step (b), the polyamic acid solution is obtained by synthesizing pyromellitic anhydride and paraphenyldiamine. Dimethylacetamide and toluene can be used as solvents. A total amount of pyromellitic anhydride and paraphenyldiamine with respect to 100 mass % of the polyamic acid solution after synthesis is preferably 1 to 45 mass %. The polyamic acid solution can be synthesized by heating a solution containing pyromellitic anhydride, paraphenyldiamine, and dimethylacetamide and toluene as the solvents. The polyimide solution can be synthesized by adding pyridine and acid anhydride as catalysts to the obtained polyamic acid solution.

Similar to the first example, the porous carbon that is the carbon aerogel (C) can be obtained by subjecting the obtained polyimide solution to the gelation step (c), the washing step (d), the supercritical drying step (e), the heat treatment step (f), and if necessary, the grinding step (g).

(D) Dispersing Agent

The varistor forming paste preferably further contains a dispersing agent (D). By further allowing the dispersing agent (D) to be contained in the varistor forming paste, the carbon aerogel (C) can be uniformly dispersed in the varistor forming paste, and thus the cured product having a higher nonlinear coefficient α can be obtained by curing the varistor forming paste.

The dispersing agent (D) preferably contains at least one selected from the group consisting of anionic surfactant, cationic surfactant, amphoteric surfactant, nonionic surfactant, hydrocarbon-based surfactant, fluorine-based surfactant, silicon-based surfactant, polycarboxylic acid, polyether-based carboxylic acid, polycarboxylate, alkyl sulfonate, alkylbenzene sulfonate, alkyl ether sulfonate, aromatic polymer, organic conductive polymer, polyalkyl oxide-based surfactant, inorganic salt, organic acid salt, and aliphatic alcohol.

The dispersing agent (D) is preferably 0.01 to 0.30 parts by mass, more preferably 0.02 to 0.25 parts by mass, even more preferably 0.03 to 0.20 parts by mass with respect to 1 part by mass of the carbon aerogel (C). When the content of dispersing agent (D) in the varistor forming paste is 0.01 to 0.30 parts by mass with respect to 1 part by mass of the carbon aerogel (C), the cured product having a high non-linear coefficient α can be obtained due to curing.

(E) Silane Coupling Agent

The varistor forming paste may further contain a silane coupling agent (E). By further allowing the silane coupling agent (E) to be contained in the varistor forming paste, adhesion between the carbon aerogel (C) and the epoxy resin (A) is improved, so that the cured product having a higher nonlinear coefficient α can be obtained.

As the silane coupling agent (E), an epoxy-based silane coupling agent is preferably used. Examples of the epoxy-based silane coupling agent include 3-glycidoxypropyltrimethoxysilane (trade name: KBM403, manufactured by Shin-Etsu Chemical Co., Ltd.), 3-glycidoxypropylmethyldimethoxysilane (trade name: KBM402, manufactured by Shin-Etsu Chemical Co., Ltd.), 3-glycidoxypropylmethyldiethoxysilane (trade name: KBE402, manufactured by Shin-Etsu Chemical Co., Ltd.), and 3-glycidoxypropyltriethoxysilane (trade name: KBE403, manufactured by Shin-Etsu Chemical Co., Ltd.).

The content of the silane coupling agent (E) in the varistor-forming paste is preferably 0.3 to 1.2 mass %, more preferably 0.4 to 1.1 mass %, and even more preferably 0.5 to 1.0 mass % with respect to 100 mass % of the varistor forming paste. When the content of the silane coupling agent (E) in the varistor forming paste is 0.3 to 1.2 mass %, the adhesion between the carbon aerogel (C) and the epoxy resin (A) in the varistor forming paste is improved, so that the cured product having a higher nonlinear coefficient α can be obtained.

The varistor forming paste may be substantially free of solvent. The varistor forming paste is preferably substantially free of solvent. “Substantially free of solvent” in the present specification means that no solvent is intentionally added to the varistor forming paste. Components contained in the varistor forming paste may already contain the solvent. Even when the varistor forming paste does not substantially contain the solvent, the varistor forming paste may contain a solvent that is inevitably contained. When the varistor forming paste does not substantially contain the solvent and the varistor forming paste is cured, voids due to volatilization of the solvent are less likely to be formed, so that the cured product having a higher nonlinear coefficient α can be obtained.

The fact that the varistor forming paste is substantially free of solvent means that, specifically, the content of the solvent contained in the varistor forming paste is less than 5 mass % with respect to a total amount of the varistor forming paste, and the content may be 3 mass % or less, 2 mass % or less, or 1 mass % or less.

The varistor forming paste may contain the solvent.

Examples of the solvent include: aromatic hydrocarbons such as toluene and xylene; ketones such as methyl ethyl ketone, methyl isobutyl ketone, and cyclohexanone; ethylene glycol monomethyl ether, ethylene glycol monoethyl ether, ethylene glycol monobutyl ether, diethylene glycol monomethyl ether, diethylene glycol monoethyl ether, diethylene glycol monobutyl ether; esters such as acetate corresponding to these ethers; and terpineol. When the varistor forming paste contains the solvent, the content of the solvent is preferably 1 to 15 mass %, and more preferably 2 to 10 mass % with respect to 100 mass % of the varistor forming paste.

Method for Producing Varistor Forming Paste

For the varistor forming paste, each component of the epoxy resin (A), the curing agent (B), the carbon aerogel (C), the dispersing agent (D) as required, and the silane coupling agent (E) as required is blended to satisfy the above-mentioned content range. Regarding production of the varistor forming paste, the production can be carried out, for example, by blending raw materials containing the epoxy resin (A), the curing agent (B), the carbon aerogel (C), the dispersing agent (D) as required, and the silane coupling agent (E) as required and by stirring and mixing them. Specifically, the varistor forming paste can be produced by stirring and mixing the raw materials using a known apparatus. As known apparatuses, for example, a Henschel mixer, a roll mill, a three-roll mill, and the like can be used. The raw materials may be charged into the apparatus at the same time and mixed. Alternatively, some of the raw materials may be charged into the apparatus first and mixed, and the rest may be charged into the apparatus later and mixed.

The viscosity of the varistor forming paste at 25° C. measured by a Brookfield type (B type) viscometer at a rotation speed of 10 rpm is preferably 5 to 100 Pa·s, more preferably 10 to 80 Pa·s, and even more preferably 12 to 70 Pa·s. When the viscosity of the varistor forming paste measured under the above conditions is in a range of 5 to 100 Pa·s, since the cured product having varistor characteristics can be sufficiently formed even in a small space between the pair of conductive members formed on a fine substrate, the degree of freedom in design is increased.

Varistor

Regarding the varistor forming paste, by connecting the pair of conductive members by screen printing or the like and obtaining a cured product by heating, a varistor containing the cured product can be formed. The cured product obtained by curing the varistor forming paste preferably has a nonlinear coefficient α of more than 6 ($\alpha>6$). The varistor containing the cured product obtained by curing the varistor forming paste is preferably used as a varistor for a surge voltage of 10 V/0.1 mA or less.

The varistor can be formed by applying the varistor forming paste around a component terminal or the like to form the cured product having varistor characteristics. Further, since the varistor forming paste can form the cured product in a film shape, the degree of freedom in design is increased when mounting the varistor on the substrate, an IC, or an electronic device. For example, in the case of use for a circuit board, the varistor containing the cured product of the varistor forming paste can be formed by applying and curing the varistor forming paste around an input and output terminal that is a terminal of an interface or around the component terminal. Further, for example, it is also possible to form a package such as an interposer having varistor characteristics by using the varistor forming paste.

EXAMPLE

Hereinafter, the present invention will be specifically described with reference to examples. The present invention is not limited to the examples.

The following raw materials were used in producing the varistor forming pastes of Examples and Comparative Example.

(A) Epoxy Resin

A1: Bisphenol F type epoxy resin (YDF-8170) (manufactured by Nippon Steel & Sumikin Chemical Co., Ltd.)

A2: N,N-diglycidyl-4-glycidyloxyaniline

A3: Bisphenol A diglycidyl ether (B) Curing Agent

B1: Amine-based curing agent: KAYAHARD A-A (HDAA) (manufactured by Nippon Kayaku Co., Ltd.)

B2: Amine-based curing agent: dimethylthiotoluenediamine (EH105L) (manufactured by ADEKA Corporation)

B3: Amine-based curing agent: diethyltoluenediamine (Ethacure 100) (manufactured by Albemarle Corporation)

B4: Phenolic curing agent: Acmex MEH8005H (manufactured by Meiwa Kasei Co., Ltd.)

B5: Acid anhydride-based curing agent: hexahydro-4-methylphthalic anhydride (manufactured by Sigma-Aldrich)

B6: Imidazole-based curing agent: 2P 4MHZ PW (manufactured by Shikoku Chemicals Corporation)

B7: Imidazole-based curing agent: 2E4MZ (TCI I0001) (manufactured by Shikoku Chemicals Corporation)

B8: Imidazole-based curing agent: 1,1'-carbonyldiimidazole (manufactured by Tokyo Chemical Industry Co., Ltd.)

B9: Amine-epoxy adduct-based curing agent: Novacure HXA9322HP (manufactured by Asahi Kasei E-Materials Corporation)

B10: Amine-epoxy adduct-based curing agent: Amicure PN-40 (manufactured by Ajinomoto Fine-Techno Co., Inc.)

(C) Carbon Aerogel

C1: Porous carbon (forming cluster), average particle size (cluster): 50 to 60 nm, average pore size of pores (cluster gap): 200 to 300 nm, integrated intensity ratio $I_D/I_G$: 2.1 to 3.0, maximum intensity ratio $M_D/M_G$: 0.80 to 3.0.

C2: Porous carbon (forming cluster), average particle size (cluster): 50 to 60 μm, average pore size of pores (cluster gap): 200 to 300 nm, integrated strength ratio $I_D/I_G$: 2.2 to 2.5, maximum intensity ratio $M_D/M_G$: 0.90 to 1.5.

(D) Dispersing Agent

D1: Polyether-based carboxylic acid: HIPLAAD ED451 (manufactured by Kusumoto Chemicals, Ltd.)

(E) Silane Coupling Agent

E1: 3-glycidoxypropyltrimethoxysilane KBM403 (manufactured by Shin-Etsu Chemical Co., Ltd.)

Production of Carbon Aerogel

The porous carbon C1 and the porous carbon C2 were produced as follows.

Production of Carbon Aerogel C1

(a) Raw Material Preparation Step

As the raw materials, 33.33 parts by mass of phloroglucinol and 66.67 parts by mass of furfural were prepared.

(b) Pretreatment Step

The ethanol solution containing phloroglucinol and furfural was obtained by dissolving phloroglucinol and furfural in 90% pure ethanol in this order so that a total amount of phloroglucinol and furfural in ethanol is 10 mass %.

(c) Gelation Step

The gelled solid was obtained by allowing the ethanol solution in which phloroglucinol and furfural were dissolved to stand at room temperature for at least 168 hours.

(d) Washing Step

Ethanol was added to the gelled solid, stirring was performed, and washing was performed to discharge the supernatant liquid. The washing was repeated until the supernatant liquid was no longer colored.

(e) Supercritical Drying Step

After washing, the gelled solid was placed in a sealed container, and the supercritical liquid $CO_2$ was introduced into the sealed container under a pressure of 8.27 to 8.96 MPa. After maintaining this state for 0.5 hours, the gelled solid was supercritically dried by discharging the supercritical liquid $CO_2$.

(f) Heat Treatment Step

The solid after supercritical drying was placed in a furnace and heated to 1000° C. at a heating rate of 1° C./min in a nitrogen atmosphere, and the heat treatment was performed by maintaining the raised temperature for 30 minutes.

(g) Grinding Step

The solid after heat treatment was crushed using an agate mortar to obtain a carbon aerogel that is the porous carbon C1 having an average particle size of 0.025 μm. The average particle size is a cumulative 50% particle size (median size, D50) integrated from the small diameter side in the volume-based particle size distribution measured by the laser diffraction/scattering type particle size distribution measuring apparatus (for example, product number: LA-960, manufactured by HORIBA, Ltd.).

Production of Carbon Aerogel C2

(a) Raw Material Preparation Step

As the raw materials, 60.00 parts by mass of pyromellitic anhydride and 25.71 parts by mass of paraphenyldiamine were prepared.

(b) Pretreatment Step

A polyamic acid solution was synthesized from pyromellitic anhydride and paraphenyldiamine, by using dimethylacetamide and toluene as solvents so that the total concentration of pyromellitic anhydride and paraphenyldiamine is 12 mass % with respect to 100 mass % of the polyamic acid solution after synthesis. A polyimide solution was synthesized by adding 4.26 parts by mass of pyridine and 10.03 parts by mass of acetic anhydride as catalysts to the obtained polyamic acid solution.

(c) Gelation Step

The gelled solid was obtained by allowing the polyimide solution to stand at room temperature for at least one hour.

(d) Washing Step

Ethanol was added to the gelled solid, stirring was performed, and washing was performed to discharge the supernatant liquid. The washing was repeated until the supernatant liquid was no longer colored.

(e) Supercritical Drying Step

After washing, the gelled solid was placed in a sealed container, and the supercritical liquid $CO_2$ was introduced into the sealed container under a pressure of 8.27 to 8.96 MPa. After maintaining this state for 0.5 hours, the gelled solid was supercritically dried by discharging the supercritical liquid $CO_2$.

(f) Heat Treatment Step

The solid after supercritical drying was placed in a furnace and heated to 1000° C. at a heating rate of 1° C./min in a nitrogen atmosphere, and the heat treatment was performed by maintaining the raised temperature for 30 minutes.

(g) Grinding Step

The solid after heat treatment was crushed using an agate mortar to obtain a carbon aerogel that is the porous carbon C2 having an average particle size of 0.025 μm. The average particle size is a cumulative 50% particle size (median size, D50) integrated from the small diameter side in the volume-based particle size distribution measured by the laser diffraction/scattering type particle size distribution measuring apparatus (for example, product number: LA-960, manufactured by HORIBA, Ltd.).

Integrated Intensity Ratio $I_D/I_G$ and Maximum Intensity Ratio $M_D/M_G$ by Raman Spectroscopy For the porous carbon C1 and the porous carbon C2, the Raman spectrum of each porous carbon was obtained using a Raman spectrometer (product number: core 7100, manufactured by Anton Paar). Each porous carbon was irradiated with a laser beam having a wavelength of 532 nm and an intensity of 50 mW, and measurement was carried out for 60 seconds. From the obtained Raman spectrum, using “Cora 7100” (manufactured by Anton Paar), the integrated intensity $I_G$ of the G band peak in the range of 1530 $cm^{-1}$ or more and 1630 $cm^{-1}$ or less and the integrated intensity $I_D$ of the D band peak in the range of 1280 $cm^{-1}$ or more and 1380 $cm^{-1}$ or less was measured, and the integrated intensity ratio $I_D/I_G$ was obtained. The integrated intensity $I_G$ of the G band peak is the peak area obtained by subtracting the background that is the noise from the G band peak. The integrated intensity $I_D$ of the D band peak is the peak area obtained by subtracting the background that is the noise from the D band peak. Further, from the Raman spectrum of each porous carbon, using “Cora 7100” (manufactured by Anton Paar), the maximum intensity ratio $M_D/M_G$ of the maximum intensity $M_G$ of the G band peak and the maximum intensity $M_D$ of the D band peak was obtained. The maximum intensity $M_G$ of the G band peak is the maximum value of the peak intensity in the G band obtained by subtracting the background that is the noise from the G band peak. The maximum intensity $M_D$ of the D band peak is the maximum value of the peak intensity in the D band obtained by subtracting the background that is the noise from the D band peak.

Average Particle Size and Average Pore Size of Pores

The porous carbon C1 and the porous carbon C2 were observed with the transmission electron microscope (TEM) to obtain TEM photographs. In the porous carbon C1 and the porous carbon C2, the particles having a size of 50 to 60 nm aggregated to form the cluster (aggregate). The arithmetic mean value of the diameters of the clusters, which can be observed from the TEM photograph, was taken as the average particle size. Further, in each TEM photograph of the porous carbon C1 and the porous carbon C2, the gap between the clusters was a pore. Maximum lengths of gaps between the clusters, which can be observed from the TEM photograph, were measured, and the arithmetic mean value thereof was taken as the average pore size of the pores. The magnification of the TEM photograph was set to 100,000 times. The average pore size of the pores, which can be observed from a sectional TEM photograph of the porous carbon C1, was 0.25 μm. The average pore size of the pores, which can be observed from the sectional TEM photograph of the porous carbon C2, was 0.25 μm.

Examples 1 to 21 and Comparative Example 1

A varistor forming paste was produced by mixing and dispersing each raw material using a three-roll mill so as to have a blending ratio shown in Tables 1 to 3 below. The varistor forming pastes of Examples 1 to 21 and the paste of Comparative Example 1 contain substantially no solvent.

The obtained varistor forming pastes of Examples and Comparative Example were used to form varistor elements as follows, and the obtained varistor elements were evaluated.

Test Production of Varistor Element

The substrate 12 having comb-shaped electrodes 14*a* and 14*b* as illustrated in FIG. 1 was used. As the substrate, a multilayer printed wiring board (with copper foil) made of FR-4 as a material was used. The electrodes 14*a* and 14*b* were formed by patterning the copper foil of the multilayer printed wiring board.

Next, as illustrated in FIG. 2, the varistor forming pastes of Examples and Comparative Example produced as described above were screen-printed to cover the comb-shaped electrodes 14*a* and 14*b* formed on a surface of the substrate 12, and cured. The curing was performed by holding at 165° C. for 2 hours. Thicknesses of the cured products after curing was 90 μm in all cases. As described above, the varistor elements of Examples and Comparative Example were formed.

Measurement of Current-Voltage Characteristics of Varistor Element, and Nonlinear Coefficient α

The current-voltage characteristics of the varistor elements of Examples and Comparative Example were measured using a system SourceMeter (registered trademark) instrument (product number: 2611B, Keithley). Specifically, a predetermined voltage was applied to the pair of electrodes (electrode 14*a* and electrode 14*b*) of the varistor element, and a current value flowing at that time was measured by using the instrument, to measure the current-voltage characteristics of the varistor element. The current-voltage characteristics of the varistor element can be approximated by $I=K \cdot V\alpha$ with K as a constant and a as a nonlinear coefficient. The nonlinear coefficient α was obtained by fitting the current-voltage characteristics of the varistor element using the simulator. Tables 1 to 3 show the nonlinear coefficient α of each of the varistor elements of Examples and Comparative Example.

Viscosity Measurement

Regarding the viscosity of each of the varistor forming pastes of Examples and Comparative Example, the viscosity (mPa·s) at 25° C. at 10 rpm was measured using a Brookfield type (B type) viscometer (product number: DV-3T, manufactured by Brookfield). Results are shown in Tables 1 to 3.

TABLE 1

| | | | Comparative Example 1 | Example 1 | Example 2 | Example 3 | Example 4 | Example 5 | Example 6 |
|---|---|---|---|---|---|---|---|---|---|
| A | A1 | parts by mass | 100 | 100 | 100 | 100 | 100 | 100 | 100 |
| | A2 | | — | — | — | — | — | — | — |
| | A3 | | — | — | — | — | — | — | — |
| B | B1 | | 44.38 | 44.38 | 44.38 | 44.38 | 44.38 | 44.38 | 44.38 |
| | B2 | | — | — | — | — | — | — | — |
| | B3 | | — | — | — | — | — | — | — |
| | B4 | | — | — | — | — | — | — | — |
| | B5 | | — | — | — | — | — | — | — |
| | B6 | | 11.70 | 11.70 | 11.70 | 11.70 | 11.70 | 11.70 | 11.70 |
| | B7 | | — | — | — | — | — | — | — |

TABLE 1-continued

| | | | Comparative Example 1 | Example 1 | Example 2 | Example 3 | Example 4 | Example 5 | Example 6 |
|---|---|---|---|---|---|---|---|---|---|
| | B8 | | — | — | — | — | — | — | — |
| | B9 | | — | — | — | — | — | — | — |
| | B10 | | — | — | — | — | — | — | — |
| C | C1 | | — | 4.01 | — | 5.65 | 1.57 | 4.00 | 4.00 |
| | C2 | | — | — | 4.01 | — | — | — | — |
| D | D1 | | — | — | — | — | — | 0.41 | — |
| E | E1 | | — | — | — | — | — | — | 0.82 |
| | Total | | 156.08 | 160.09 | 160.09 | 161.73 | 157.65 | 160.50 | 160.90 |
| Nonlinear coefficient α | | | 1.0 | 6.5 | 6.4 | 6.1 | 6.0 | 6.6 | 6.8 |
| Viscosity (10 rpm) | | Pa · s | 5.5 | 29.8 | 28.4 | 48.2 | 13.2 | 28.1 | 28.3 |

TABLE 2

| | | | Example 7 | Example 8 | Example 9 | Example 10 | Example 11 | Example 12 | Example 13 |
|---|---|---|---|---|---|---|---|---|---|
| A | A1 | parts by mass | 100 | 100 | 100 | 100 | 100 | 100 | 100 |
| | A2 | | — | — | — | — | — | — | — |
| | A3 | | — | — | — | — | — | — | — |
| B | B1 | | 44.38 | 44.38 | 44.38 | 54.40 | 34.13 | — | — |
| | B2 | | — | — | — | — | — | 42.31 | — |
| | B3 | | — | — | — | — | — | — | 31.13 |
| | B4 | | — | — | — | — | — | — | — |
| | B5 | | — | — | — | — | — | — | — |
| | B6 | | 11.7 | 16.04 | 7.60 | 12.52 | 10.88 | 11.54 | 10.63 |
| | B7 | | — | — | — | — | — | — | — |
| | B8 | | — | — | — | — | — | — | — |
| | B9 | | — | — | — | — | — | — | — |
| | B10 | | — | — | — | — | — | — | — |
| C | C1 | | 4.01 | 4.12 | 3.90 | 4.29 | 3.72 | 3.95 | 3.64 |
| | C2 | | — | — | — | — | — | — | — |
| D | D1 | | 0.41 | — | — | — | — | — | — |
| E | E1 | | 0.82 | — | — | — | — | — | — |
| | Total | | 161.32 | 164.54 | 155.89 | 171.21 | 148.74 | 157.80 | 145.41 |
| Nonlinear coefficient α | | | 7.1 | 6 | 6.1 | 6.4 | 6.5 | 6.4 | 6.3 |
| Viscosity (10 rpm) | | Pa · s | 27.4 | 24.1 | 36.2 | 22.1 | 39.1 | 27.5 | 34.1 |

TABLE 3

| | | | Example 14 | Example 15 | Example 16 | Example 17 | Example 18 | Example 19 | Example 20 | Example 21 |
|---|---|---|---|---|---|---|---|---|---|---|
| A | A1 | parts by mass | — | — | 100 | 100 | 100 | 100 | 100 | 100 |
| | A2 | | 100 | — | — | — | — | — | — | — |
| | A3 | | — | 100 | — | — | — | — | — | — |
| B | B1 | | 40.24 | 69.62 | 44.13 | 44.13 | 59.26 | 44.13 | — | — |
| | B2 | | — | — | — | — | — | — | — | — |
| | B3 | | — | — | — | — | — | — | — | — |
| | B4 | | — | — | — | — | — | — | 44.38 | — |
| | B5 | | — | — | — | — | — | — | — | 44.38 |
| | B6 | | 11.37 | 13.76 | — | — | — | — | 11.70 | 11.70 |
| | B7 | | — | — | 11.68 | — | — | — | — | — |
| | B8 | | — | — | — | 11.68 | — | — | — | — |
| | B9 | | — | — | — | — | 46.84 | — | — | — |
| | B10 | | — | — | — | — | — | 11.68 | — | — |
| C | C1 | | 3.89 | 4.71 | 4.00 | 4.00 | 5.29 | 4.00 | 4.01 | 4.01 |
| | C2 | | — | — | — | — | — | — | — | — |
| D | D1 | | — | — | — | — | — | — | — | — |
| E | E1 | | — | — | — | — | — | — | — | — |
| | Total | | 155.50 | 188.09 | 159.82 | 159.82 | 211.39 | 159.82 | 160.09 | 160.09 |
| Nonlinear coefficient α | | | 6.4 | 6.6 | 6.4 | 6.3 | 6.4 | 6.5 | 6.3 | 6.1 |
| Viscosity (10 rpm) | | Pa · s | 28.2 | 24.1 | 28.7 | 29.1 | 21.2 | 28.4 | 32.5 | 25.3 |

As shown in Tables 1 to 3, all the varistor elements formed by using the varistor forming pastes of Examples 1 to 21 have a nonlinear coefficient α (α>6) exceeding 6.0, and have appropriate varistor characteristics that can withstand use as the varistor for the surge voltage of 10 V/0.1 mA or less.

As shown in Tables 1 to 3, the varistor forming pastes of Examples 1 to 21 have viscosities of 12 to 70 Pa·s at 25° C. measured by the Brookfield type (B type) viscometer at the rotation speed of 10 rpm, and it was possible to sufficiently form the cured product having varistor characteristics even in the small space between the pair of conductive members formed on the fine substrate.

The element formed by using the paste of Comparative Example 1 had a nonlinear coefficient α of 1.0 and did not have varistor characteristics.

INDUSTRIAL APPLICABILITY

The varistor forming paste according to the embodiment of the present invention can form the varistor around the input and output terminal that is the terminal of the interface or around the component terminal, and can be suitably used to form the package such as the interposer having varistor characteristics.

LIST OF REFERENCE SIGNS

10: Varistor element, 12: Substrate, 14*a*, 14*b*: Electrode, 16: Varistor.

The invention claimed is:

1. A varistor forming paste comprising:

an epoxy resin (A);

a curing agent (B); and a carbon aerogel (C).

2. The varistor forming paste according to claim 1, wherein the epoxy resin (A) comprises at least one selected from the group consisting of bisphenol A type epoxy resin, brominated bisphenol A type epoxy resin, bisphenol F type epoxy resin, aminophenol type epoxy resin, biphenyl type epoxy resin, novolak type epoxy resin, alicyclic epoxy resin, naphthalene type epoxy resin, ether-based epoxy resin, polyether-based epoxy resin, and silicone epoxy copolymer resin.

3. The varistor forming paste according to claim 1, wherein the curing agent (B) comprises at least one selected from the group consisting of an amine-based curing agent, a phenolic curing agent, an acid anhydride-based curing agent, and an imidazole-based curing agent.

4. The varistor forming paste according to claim 1, wherein the carbon aerogel (C) is porous carbon having pores with an average pore size of less than 1 μm, and in a Raman spectrum of the porous carbon measured by Raman spectroscopy, an integrated intensity ratio $I_D/I_G$ of an integrated intensity $I_G$ of a G band peak in a range of 1530 $cm^{-1}$ or more and 1630 $cm^{-1}$ or less and an integrated intensity $I_D$ of a D band peak in a range of 1280 $cm^{-1}$ or more and 1380 $cm^{-1}$ or less is 2.0 or more.

5. The varistor forming paste according to claim 4, wherein in the Raman spectrum of the porous carbon measured by Raman spectroscopy, a maximum intensity ratio $M_D/M_G$ of a maximum intensity $M_G$ of the G band peak and a maximum intensity $M_D$ of the D band peak is 0.80 or more.

6. The varistor forming paste according to claim 1, comprising 0.05 to 10 mass % of the carbon aerogel (C) with respect to 100 mass % of the varistor forming paste.

7. The varistor forming paste according to claim 1, further comprising a dispersing agent (D).

8. The varistor forming paste according to claim 7, wherein the dispersing agent (D) comprises at least one selected from the group consisting of anionic surfactant, cationic surfactant, amphoteric surfactant, nonionic surfactant, hydrocarbon-based surfactant, fluorine-based surfactant, silicon-based surfactant, polycarboxylic acid, polyether-based carboxylic acid, polycarboxylate, alkyl sulfonate, alkylbenzene sulfonate, alkyl ether sulfonate, aromatic polymer, organic conductive polymer, polyalkyl oxide-based surfactant, inorganic salt, organic acid salt, and aliphatic alcohol.

9. The varistor forming paste according to claim 1, further comprising a silane coupling agent (E).

10. The varistor forming paste according to claim 1, which is substantially free of solvent.

11. The varistor forming paste according to claim 1, wherein an amount of solvent is less than 5 mass % with respect to a total amount of the varistor forming paste.

12. A cured product of the varistor forming paste according to claim 1.

13. A varistor comprising a cured product of the varistor forming paste according to claim 1.

* * * * *